United States Patent
Rakshit et al.

(10) Patent No.: US 10,339,361 B2
(45) Date of Patent: Jul. 2, 2019

(54) COMPOSITE FINGERPRINT AUTHENTICATOR

(71) Applicant: INTERNATIONAL BUSINESS MACHINES CORPORATION, Armonk, NY (US)

(72) Inventors: Sarbajit K. Rakshit, Kolkata (IN); Sathya Santhar, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 15/467,461

(22) Filed: Mar. 23, 2017

(65) Prior Publication Data
US 2018/0276450 A1    Sep. 27, 2018

(51) Int. Cl.
  *G06K 9/00*    (2006.01)
  *G06F 21/32*   (2013.01)

(52) U.S. Cl.
  CPC ......... *G06K 9/00093* (2013.01); *G06F 21/32* (2013.01); *G06K 9/0002* (2013.01); *G06K 9/00026* (2013.01); *G06K 9/00073* (2013.01)

(58) Field of Classification Search
  CPC ........... G06K 9/00006; G06K 9/00013; G06K 9/008; G06K 9/001; G06K 9/00107; G06K 9/00087; G06K 9/00093
  See application file for complete search history.

(56) References Cited

U.S. PATENT DOCUMENTS

| | | | |
|---|---|---|---|
| 5,601,867 A * | 2/1997 | Riedl | A61B 5/1172 118/31.5 |
| 6,546,122 B1 * | 4/2003 | Russo | G06K 9/00026 382/125 |
| 7,184,579 B2 | 2/2007 | Mizoguchi | |
| 9,311,545 B2 | 4/2016 | Mankowski | |
| 9,639,620 B1 * | 5/2017 | Ding | G01N 3/40 |
| 9,867,134 B2 * | 1/2018 | Setlak | G06T 7/0002 |
| 2003/0142856 A1 * | 7/2003 | McClurg | G06K 9/00013 382/124 |
| 2006/0056665 A1 * | 3/2006 | Iannone | G06K 9/00006 382/116 |
| 2007/0126560 A1 * | 6/2007 | Seymour | B60R 25/241 340/426.1 |
| 2008/0049987 A1 * | 2/2008 | Champagne | G06K 9/00026 382/124 |

(Continued)

OTHER PUBLICATIONS

Prabhakar, Salil, and Anil K. Jain. "Decision-level fusion in fingerprint verification." Pattern Recognition 35.4 (2002): 861-874. (Year: 2002).*

(Continued)

*Primary Examiner* — Bobbak Safaipour
(74) *Attorney, Agent, or Firm* — Patrick J. Daugherty; Daugherty & Del Zoppo Co., LPA

(57) ABSTRACT

A computer-implemented method for authenticating a composite fingerprint includes executing on a computer processor the step of receiving the composite fingerprint, wherein the composite fingerprint is a thermal image of a reference finger with a thermal impression of another finger from a thermal scanner. The composite fingerprint is authenticated according to a known fingerprint of the reference finger and a known fingerprint of the other finger. A result of the authentication is returned.

20 Claims, 5 Drawing Sheets

(56) References Cited

U.S. PATENT DOCUMENTS

| | | | | |
|---|---|---|---|---|
| 2008/0166029 | A1* | 7/2008 | Presura | G06K 9/00033 |
| | | | | 382/124 |
| 2009/0074263 | A1* | 3/2009 | Higuchi | A61B 5/1172 |
| | | | | 382/126 |
| 2009/0080717 | A1* | 3/2009 | Dias | G06K 9/00013 |
| | | | | 382/124 |
| 2009/0243790 | A1* | 10/2009 | Puolitaival | G06F 1/1626 |
| | | | | 340/5.1 |
| 2012/0044156 | A1* | 2/2012 | Michaelis | G06F 3/03547 |
| | | | | 345/173 |
| 2014/0133714 | A1* | 5/2014 | Ivanov | G06K 9/00013 |
| | | | | 382/124 |
| 2014/0294261 | A1* | 10/2014 | Abe | G06K 9/00006 |
| | | | | 382/124 |
| 2015/0071508 | A1* | 3/2015 | Boshra | G06K 9/00013 |
| | | | | 382/124 |
| 2015/0097936 | A1* | 4/2015 | Simske | G06K 9/00033 |
| | | | | 348/77 |
| 2016/0070980 | A1* | 3/2016 | Kumar | G06F 16/5854 |
| | | | | 382/115 |
| 2016/0098550 | A1* | 4/2016 | Lam | G06F 21/32 |
| | | | | 726/18 |
| 2016/0110583 | A1* | 4/2016 | Kuo | G06K 9/00093 |
| | | | | 382/125 |
| 2016/0180139 | A1* | 6/2016 | Hung | A61B 5/1172 |
| | | | | 382/124 |
| 2017/0011540 | A1* | 1/2017 | Bauchspies | G06K 9/00013 |
| 2017/0083750 | A1* | 3/2017 | Chin | H04L 63/0861 |
| 2017/0169275 | A1* | 6/2017 | Mackey | G06K 9/00013 |
| 2017/0169278 | A1* | 6/2017 | Setterberg | G06K 9/0002 |
| 2017/0193209 | A1* | 7/2017 | Mohan | G06F 21/316 |
| 2017/0231534 | A1* | 8/2017 | Agassy | G06K 9/00107 |
| | | | | 382/124 |
| 2017/0249495 | A1* | 8/2017 | Hao | G06K 9/00026 |
| 2018/0039817 | A1* | 2/2018 | Romera Jolliff | G06K 9/00026 |
| 2018/0165508 | A1* | 6/2018 | Othman | G06K 9/00093 |
| 2018/0247098 | A1* | 8/2018 | Yoshii | G06K 9/001 |

OTHER PUBLICATIONS

Zhao, Qijun, and Anil K. Jain. "Model based separation of overlapping latent fingerprints." IEEE Transactions on Information Forensics and Security 7.3 (2012): 904-918. (Year: 2012).*

Al-alem, Fatimah, Mohammad A. Alsmirat, and Mahmoud Al-Ayyoub. "On the road to the internet of biometric things: a survey of fingerprint acquisition technologies and fingerprint databases." Computer Systems and Applications (AICCSA), 2016 IEEE/ACS 13th International Conference of. IEEE, 2016. (Year: 2016).*

Chen, Fanglin, et al. "Separating overlapped fingerprints." IEEE Transactions on Information Forensics and Security 6.2 (2011): 346-359. (Year: 2011).*

Peter Mell et al, The NIST Definition of Cloud Computing, National Institute of Standards and Technology, Publication 800-145, 2011.

Asker M. Bazen, Fingerprint Identification—Feature Extraction, Matching, and Database Search, 2002.

* cited by examiner

COMPOSITE FINGERPRINT AUTHENTICATOR

BACKGROUND

A user is authenticated using a fingerprint of a finger of the user matched to a known fingerprint of the finger of the user. The user places the finger on a surface of a scanning device, which scans the surface of the finger and generates an image or print of the finger. The scanning device generates an image of the surface of the finger at a spatial resolution sufficient to spatially delineate valleys and ridges in the image of a fingerprint.

The scanning device uses an imaging technique for producing the scanned image of the fingerprint, which can include thermal scanning. Thermal scanning uses temperature differences between the scanned ridges and valleys of a finger to generate the fingerprint. The scanning device includes a thermal resolution sufficient to sense the differences between temperatures of the ridges and temperatures of the valleys.

The fingerprint or information extracted from the fingerprint is compared to a previously stored fingerprint or information extracted from a previously generated fingerprint. The stored fingerprint or information extracted from the previously generated fingerprint is known by the authenticator to be of the person requesting authentication. If the comparison indicates a match, then authentication is indicated, otherwise authentication is denied.

Information extracted from a fingerprint image can include minutiae, which indicate the spatial locations of features of the ridges and valleys, such as bifurcations, beginnings and ends of ridges, and the like. Other information extracted from a fingerprint image can include directional fields and singular points. The fingerprint image can be represented by a binary matrix that indicates for each spatial location a presence of a ridge as one binary value or a presence of a valley as the other binary value.

BRIEF SUMMARY

In one aspect of the present invention, a computer-implemented method for authenticating a composite fingerprint includes executing on a computer processor the step of receiving the composite fingerprint, wherein the composite fingerprint is a thermal image of a reference finger with a thermal impression of another finger from a thermal scanner. The composite fingerprint is authenticated according to a known fingerprint of the reference finger and a known fingerprint of the other finger. A result of the authentication is returned.

In another aspect, a system for authenticating a composite fingerprint has a hardware processor, computer readable memory in circuit communication with the processor, and a computer-readable storage medium in circuit communication with the processor and having program instructions stored thereon. The processor executes the program instructions stored on the computer-readable storage medium via the computer readable memory and thereby receive the composite fingerprint, wherein the composite fingerprint is a thermal image of a reference finger with a thermal impression of another finger from a thermal scanner. The composite fingerprint is authenticated according to a known fingerprint of the reference finger and a known fingerprint of the other finger. A result of the authentication is returned.

In another aspect, a computer program product for authenticating a composite fingerprint has a computer-readable storage medium with computer readable program code embodied therewith. The computer readable hardware medium is not a transitory signal per se. The computer readable program code includes instructions for execution by a processor that cause the processor to receive the composite fingerprint, wherein the composite fingerprint is a thermal image of a reference finger with a thermal impression of another finger from a thermal scanner. The composite fingerprint is authenticated according to a known fingerprint of the reference finger and a known fingerprint of the other finger. A result of the authentication is returned.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
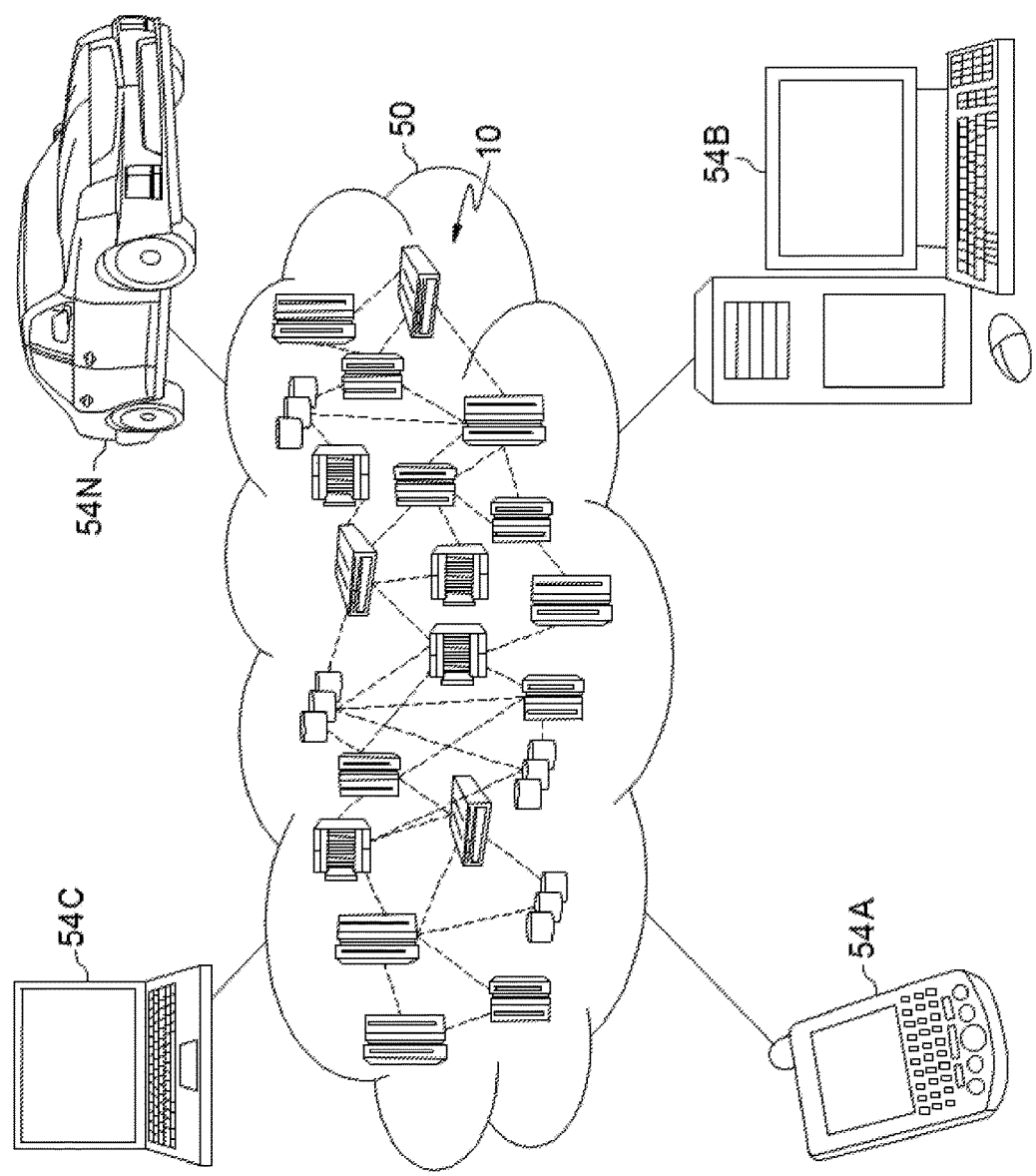
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
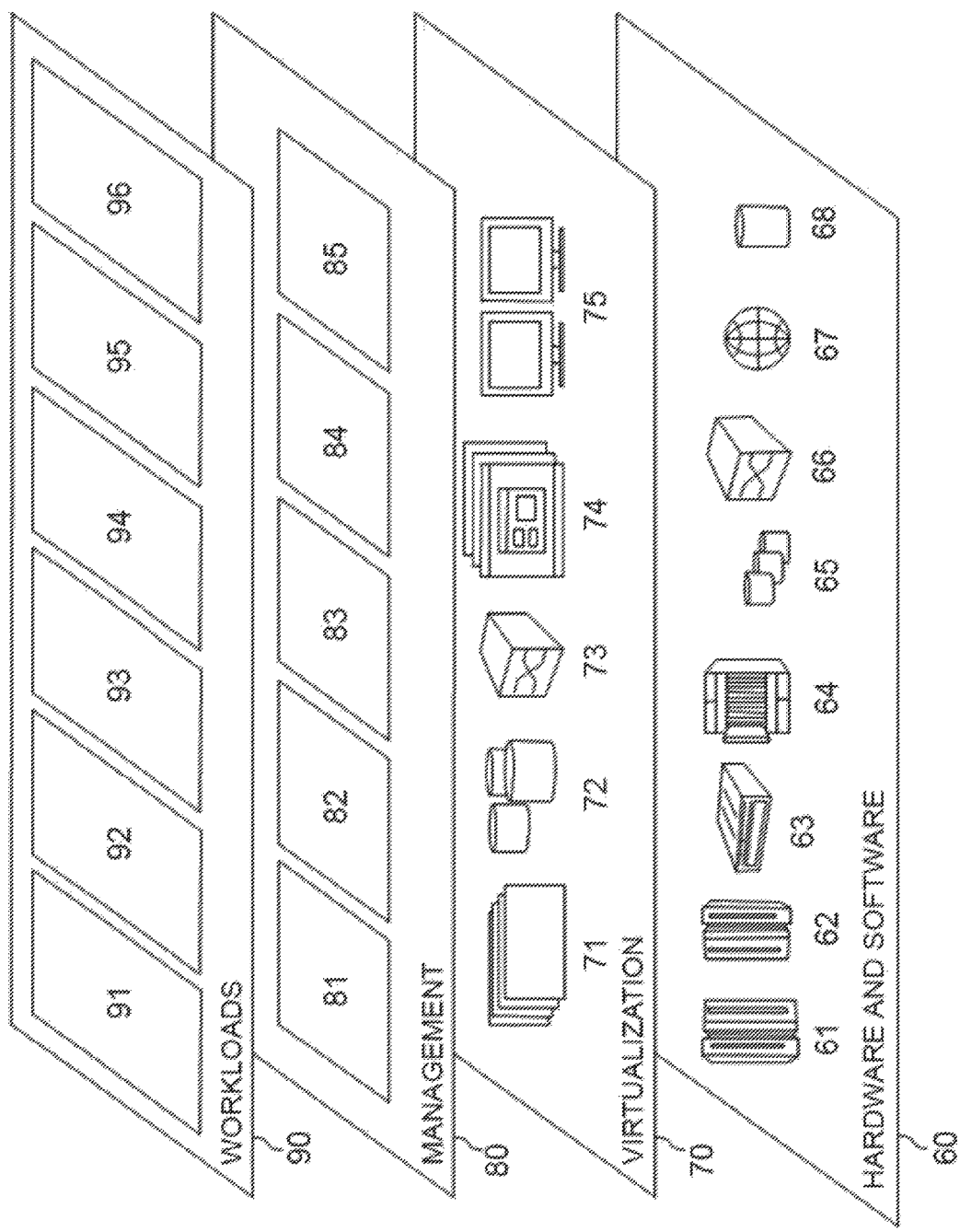
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authenticating a composite fingerprint 96.

Figure 3:
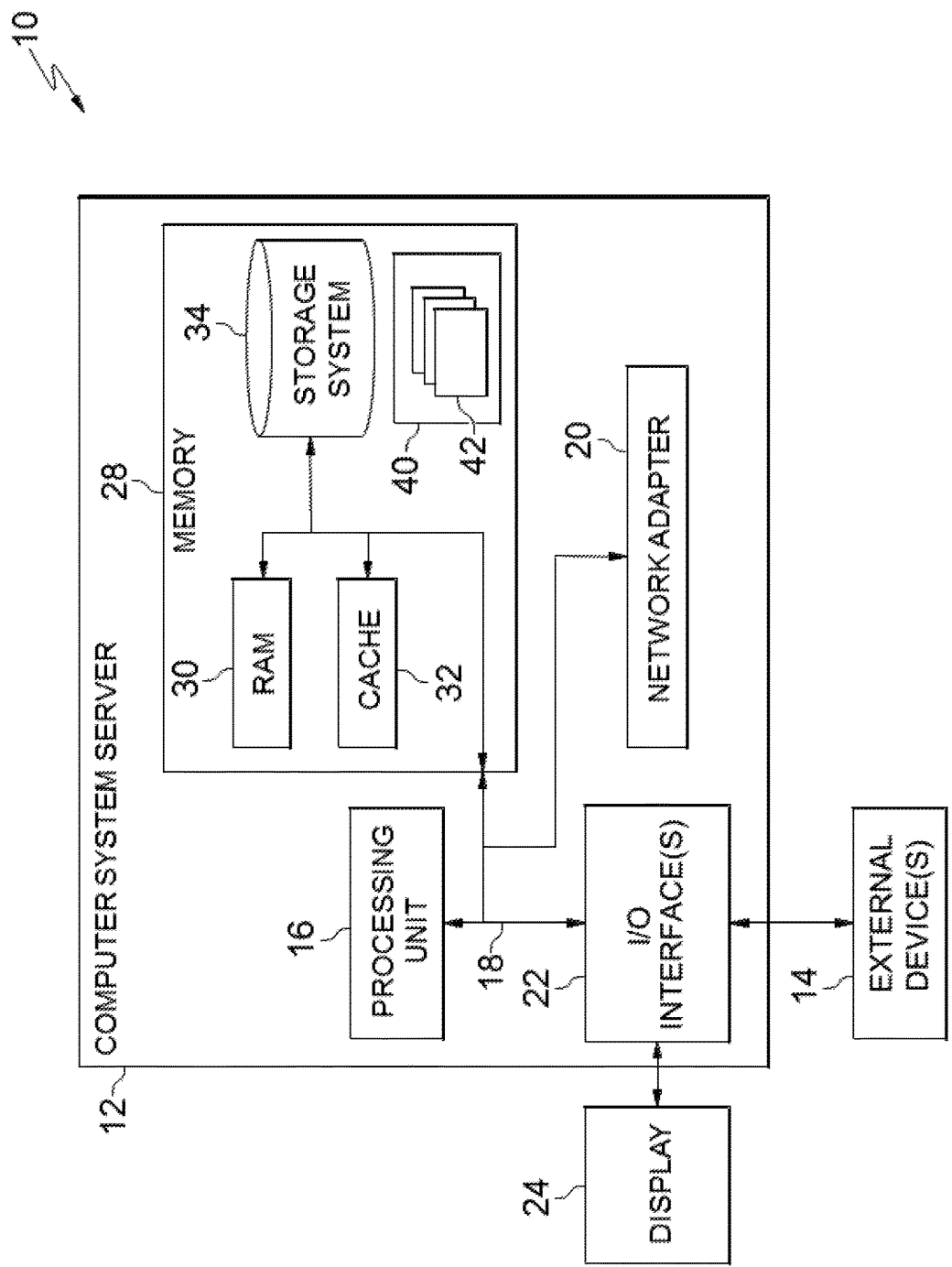
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
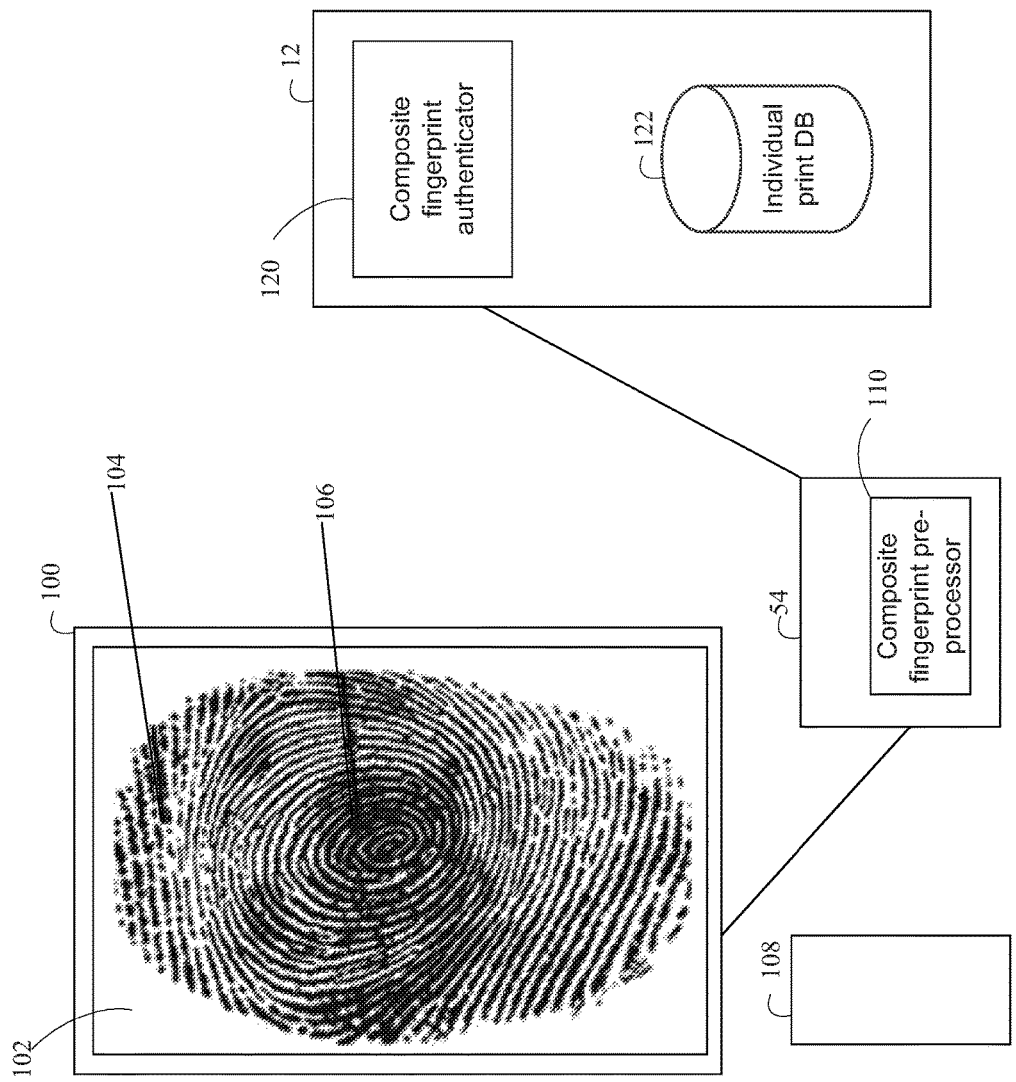
FIG. 4 depicts a schematic illustration of system aspects according to an embodiment of the present invention

FIG. 4 illustrates schematically a system according to the present invention for authenticating composite fingerprints. A thermal scanner 100 generates a composite fingerprint 102 from a thermal scan of a reference finger. The generated composite fingerprint 102 includes a print of reference finger 104 with a thermal impression of another finger 106. For example, a temperature difference is created on an index finger by placing or rubbing the index finger on a temperature changing surface 108, to induce a temperature change in the skin of the index finger. The index finger with the temperature difference is pressed against a thumb and then the index finger is scanned by the thermal scanner 100. The generated composite fingerprint 102 of the index finger includes both the print of index finger and the thermal impression of the thumb on the index finger. The thermal scan is performed before homeostasis re-establishes a normal surface temperature for the reference finger. In some embodiments, the other finger 106 includes a combination of fingers. For example, with a thumb as the reference finger 104, thermal impressions are made onto the thumb with both the index finger followed by the middle finger.

The temperature difference can be created by the temperature changing surface 108 either by heating or cooling of a finger or an action that heats or cools the finger surface. For example, the surface of the index finger is heated through friction by rubbing the finger across a suitable material of the temperature changing surface 108, such as a cloth material. In another example, the surface of the index finger is cooled by placing the index finger on the temperature changing surface 108, such as a refrigerated stone that absorbs heat from the surface of the index finger. The index finger is then pressed against a thumb, which is initially of a normal temperature. Either of surface of the reference finger or the other finger can be heated or cooled to provide a temperature difference in the thermal impression.

The composite fingerprint 102 can be formed with a print from the reference finger 104 with the other finger 106 as any combination of at least two digits of ten digits of a person. For example, an index finger of the left hand is warmed and pressed to the index finger of the right hand. Either index finger can be used as the reference finger. The composite fingerprint 102 can include gray scale values according to the temperatures of each pixel. Thus, the gray scale values include differences in values representing features of the composite fingerprint 102 that pixels distinguish combinations of the ridges and valleys from each finger, such as a ridge of reference finger and a ridge of other finger, a ridge of reference finger and a valley of other finger, a valley of reference finger and a ridge of other finger, a valley of reference finger and a valley of other finger, a ridge of reference finger and no presence of other finger, and a valley of reference finger and no presence of other finger. In some embodiments, the gray scale values can be converted to binary values that distinguish between a ridge of at least one finger, and no ridge present.

A composite fingerprint pre-processor 110 can pre-process the composite thermal fingerprint 102. In some embodiments, the composite fingerprint pre-processor 110 removes noise through ridge thinning and/or false minutiae removal using algorithms known in the art. In some embodiments, the composite fingerprint pre-processor 110 extracts identifying information, such as minutiae, singular points, directional fields, combinations thereof, and the like from the composite thermal fingerprint 102. In some embodiments, the composite fingerprint pre-processor 110 converts the gray scale values to binary values.

For example in a minutiae based approach, an 8-bit gray scale composite fingerprint image is reduced to a binary representation with one value for ridges, such as 0, and the other value, such as 1 for non-ridges. The ridge thinning algorithm removes redundant pixels of ridges. Information, such as the minutiae is extracted after the ridge thinning. The extracted information from the composite thermal fingerprint 102 comprise information from both fingers represented in the composite thermal fingerprint 102.

A composite fingerprint authenticator 120 authenticates the composite fingerprint 102 according to known individual fingerprints or information extracted from individual fingerprints stored in an individual fingerprint database 122. Authentication techniques can include correlation based fingerprint matching, likelihood ratio-based biometric verification, elastic minutiae matching, intrinsic coordinate matching, and the like. The authentication techniques can include local matching, particularly of those portions of the reference fingerprint 104 excluding the thermal impression, as well as global matching on the composite fingerprint 102 and a corresponding generated composite fingerprint or information extracted from the individual fingerprints in the individual fingerprint database 122.

In some embodiments, the identification of the fingers represented as the reference finger 104 and the other finger 106 are part of the authentication. For example, an authentication for user X for system A includes a reference finger 104 that is a thumb of the left hand, and the other finger 106 that is an index finger of the left hand. The authentication for user X for system B includes a reference finger 104 that is the thumb of the left hand, the other finger 106 that is the middle finger of the left hand. In some embodiments system A and B can represent different functions of a same system. For example, in a bank automatic teller machine (ATM) machine system, a composite fingerprint 102 includes that of the thumb and the fore finger for a first function to obtain a money balance and a composite fingerprint 102 includes that of the thumb and the middle finger for a second function to withdraw money.

Composite fingerprint authentication has the advantage over conventional fingerprint authentication, which authenticates each finger individually and separately, and thus, the finger used for authentication can be observed while scanning or known through business practice. Furthermore, individual fingerprints are more easily duplicated or "lifted", than a composite fingerprint 102, which is formed just before scanning and the thermal impression naturally disappears as the body re-establishes homeostasis.

In some embodiments, the composite fingerprint authenticator 120 indicates the reference finger 104 and the other finger 106 to form the composite fingerprint 102 according to a selection of the individual prints stored in the individual fingerprint database 122. For example, in a challenge—response scenario, a user requests authentication, and the system responds with the finger to be scanned and the finger to be used for the thermal impression on the finger to be scanned. The finger to be scanned and the finger to be used for the thermal impression are selected from the individual prints for the user stored in the individual fingerprint database 122. The user heats or cools the finger to be scanned or the finger to be used for the thermal impression, makes the thermal impression on the finger to be scanned, and scans the finger to be scanned in the thermal scanner 100. The selection of individual prints for the user can consider those that the user can realistically press together, such as the thumb with a finger of the same hand or a finger from each of two hands, and not two non-opposing fingers from a same hand. The selection of fingers to form the composite fingerprint 102 can be random within the constraints of those fingers capable of pressing together for a thermal impression.

The composite fingerprint authenticator 120 authenticates the fingerprint in the image of the composite fingerprint 102 or information extracted from the composite fingerprint 102. In some embodiments, the individual prints or the information extracted from the individual fingerprint database 122 are combined and the combination matched to the composite fingerprint 102 or information extracted from the composite fingerprint 102.

In some embodiments, the individual prints or the information extracted from the individual fingerprint database 122 are matched successively. For example, singular points and/or minutiae extracted from the composite fingerprint 102 are first compared with the singular points and/or minutiae from an individual print of the reference finger 104, and then compared with the minutiae from an individual print of the other finger 106.

In some embodiments, a hybrid approach uses singular points and/or minutiae extracted from the composite fingerprint 102 to orient and position the prints from the individual fingerprint database 122 relative to each other, which are then combined and used to authenticate the composite fingerprint 102.

The composite fingerprint pre-processor 110 can be integrated into the local computing device 54 used by cloud consumers, such as, for example, the personal digital assistant (PDA) or cellular telephone 54A, the desktop computer 54B, the laptop computer 54C, and/or the automobile computer system 54N. The composite pre-processor can be integrated into a node 10. In some instances, the composite fingerprint pre-processor 110 avoids transmission of the composite fingerprint 102 by extracting information, such as the minutiae, singular points, directional fields and the like rather than transmitting the image of the composite fingerprint 102, which can reduce security risks.

The composite fingerprint authenticator 120 can be integrated in the local computing device or integrated into a node 10, such as the computer server 12. The composite fingerprint authenticator 120 can be offered as a service as described above.

The individual print database can be integrated into the local computing device 54 or node 10, such as stored in the memory 28 of the computer server 12.

Figure 5:
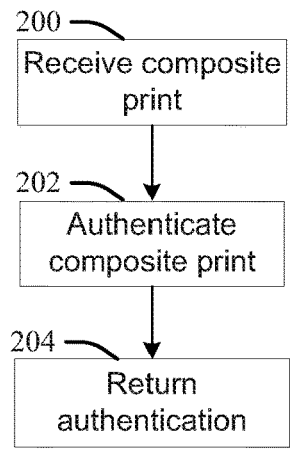
FIG. 5 is a flow chart illustration of an embodiment of the present invention.

FIG. 5 illustrates one embodiment of a method according to the present invention for authenticating composite fingerprints 102. At 200, a processor that is configured according to an aspect of the present invention (the "configured processor"), receives a composite fingerprint 102. The composite fingerprint 102 can comprise a request for authentication. The configured processor may be implemented in accordance with the computer system server 12 of FIGS. 3 and 4, including as the cloud node 10 of FIG. 1, as described respectively above. The request for authentication can identify the node 10 or the local computing device 54 requesting authentication. The composite fingerprint 102 is an image generated by the thermal scanner 100 and includes the reference finger 104 with the thermal impression of the other finger 106.

At 202 the configured processor authenticates the composite fingerprint 102. Authentication can include pre-processing, which reduces noise or enhances features of the composite fingerprint 102, such as through ridge thinning or removal of false minutiae. Pre-processing can include extraction of information, such as minutiae, singular points, directional fields, or combinations thereof. Pre-processing can include conversion from gray scale values of the scanned thermal image to binary values, where one binary value represents the presence of at least one ridge, and the other binary value represents the absence of a ridge.

Authentication includes matching of the composite fingerprint 102 or information extracted therefrom either with separate known prints from individual fingers or combined known prints from the individual fingers. For example, with a composite fingerprint 102 of an index finger with a thermal impression of a thumb, the composite fingerprint 102 is matched separately with a fingerprint of the index finger and a fingerprint of the thumb, or the composite fingerprint 102 is matched with combined prints of the index finger with the thumb in an overlay or superimposed images. In some embodiments, each pixel of the combined image is represented as one binary value according to the presence of at least one ridge from either of the individual images and the other binary value in the absence of ridges from both individual images.

The combined prints can include an initial positioning and orientation of the two fingerprints relative to each other. For example, extracted information from the composite fingerprint 102, such as minutiae or singular points are used to orient and position separate known prints of the reference finger 104 and the other finger 106 before combining. The known prints combined with an orientation and a position according to the information extracted from the composite fingerprint 102 to form a combined fingerprint, which is then matched with the composite fingerprint 102.

Authentication can include a known selection of fingers that form the composite fingerprint 102. For example, a known selection of fingers as the reference finger 104 and the other finger 106 comprise part of the authentication according to the node 10 requesting authentication. That is, one node can include a different selection of fingers to form the composite fingerprint 102 than another node.

At 204, the configured processor returns a result of the authentication. For example, in the instance of a match between the composite fingerprint 102 and the known prints of the reference finger 104 and the other finger 106, the configured processor returns authentication in the affirmative. Returning authentication can include authorizing access, granting access or returning a key, and the like to the node 10 requesting authenticated access. In the instance of a non-match, the configured processor returns authentication in the negative. Returning authentication in the negative can include denying access to a node 10 requesting access, sending of a message, recording a failed access attempt, requesting another authenticating scan, taking no further action, combinations thereof and the like.

Figure 6:
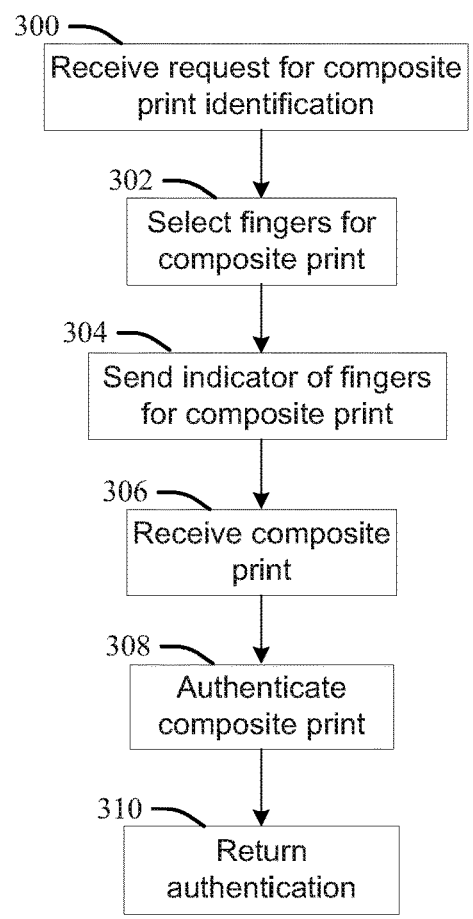
FIG. 6 is a flow chart illustration of another embodiment of the present invention.

FIG. 6 illustrates another embodiment of a method according to the present invention for authenticating composite fingerprints 102. At 300, a configured processor receives a request for authentication.

At 302, the configured processor selects two fingers for forming a composite fingerprint 102. The fingers are selected according to known individual fingerprints or information extracted from known individual fingerprint. The selection can include constraints of two fingers which exclude non-opposing fingers from a same hand. In one embodiment, the configured processor selects the finger for the reference fingerprint 104 and the finger to be used for the other fingerprint 106.

At 304, the configured processor sends an indicator of the fingers to be used to form the composite fingerprint 102. The sent indicator can include a display on a display device, such as a message indicating the fingers to be used to form the composite fingerprint 102, a visual representation of the fingers on a hand(s) indicating the fingers to be used to form the composite fingerprint 102, instructions, graphic animations or a visual representation of how to form the composite fingerprint 102, combinations thereof, and the like. The sent indicator can include identification of the reference finger and the other finger.

At 306, the configured processor receives the composite fingerprint 102 in response to the sent indicator. The composite fingerprint 102 is the image generated by the thermal scanner 100 and includes the reference finger 104 with the thermal impression of the other finger 106.

At 308, the configured processor authenticates the composite fingerprint according to the selected fingers. In some embodiments, authentication further includes matching of the corresponding prints for the reference finger and the other finger. For example, where the indicator indicates the thumb of the left hand as the reference finger and the index finger of the left hand, a composite fingerprint 102 formed with index finger of the left hand as the reference finger and the thumb as the other finger are excluded.

Authentication can include pre-processing, such as described above in reference to FIGS. 4 and 5. Authentication includes matching of the composite fingerprint 102 or information extracted therefrom either with separate known prints from the selected individual fingers or combined known prints from the selected individual fingers. The combined prints can include an initial positioning and orientation of the two fingerprints relative to each other.

At 310, the configured processor returns a result of the authentication of the received composite fingerprint 102. For example, in the instance of a match between the composite fingerprint 102 and the known prints of the reference finger 104 and the other finger 106, the configured processor returns authentication in the affirmative. Returning authentication can include authorizing access, granting access or returning a key, and the like to the node 10 requesting authenticated access. In the instance of a non-match, the configured processor returns authentication in the negative. Returning authentication in the negative can include denying access to a node 10 requesting access, sending of a message, recording a failed access attempt, requesting another authenticating scan, taking no further action, combinations thereof and the like.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    receiving a composite fingerprint comprising thermal image data generated from a single thermal scan of a reference finger by a thermal scanner, wherein the composite fingerprint thermal image data comprises a first fingerprint plurality of ridges having a first temperature value and a second fingerprint plurality of ridges having a second temperature value that is different from the first temperature value;
    authenticating the composite fingerprint in response to matching the first fingerprint plurality of ridges to a known fingerprint of the reference finger and to matching the second fingerprint plurality of ridges to a known fingerprint of an other finger that is different from the reference finger; and
    returning a result of the authentication.

2. The method of claim 1, wherein authenticating includes:
    pre-processing the composite fingerprint in a process that is selected from the group consisting of:
    a noise removal process that is selected from ridge thinning and false minutiae removal;
    extracting information from the composite fingerprint selected from minutiae, singular points and directional fields; and
    converting gray scale values to binary values.

3. The method of claim 2, wherein authenticating includes:
    matching the extracted information from the composite fingerprint with information extracted from the known fingerprint of the reference finger and information extracted from the known fingerprint of the other finger.

4. The method of claim 2, wherein authenticating includes:
    matching the extracted information from the composite fingerprint with information extracted from a combined image of the known fingerprint of the reference finger and the known fingerprint of the other finger.

5. The method of claim 1, further comprising:
    in response to a request for authentication, selecting the reference finger from a plurality of fingers corresponding to known fingerprints stored in a fingerprint database and the other finger from the plurality of fingers excluding the selected reference finger and corresponding to the known fingerprints stored in the fingerprint database; and
    sending an indicator of the selected fingers to a local computing device, wherein the selected fingers correspond to the reference finger and the other finger that form the composite fingerprint.

6. The method of claim 1, wherein the composite fingerprint thermal image data comprises a thermal image acquired by the thermal scanner of the reference finger with a thermal impression of the other finger that is formed with a temperature difference between the reference finger and the other finger that is differentiated according to the thermal scanner.

7. The method of claim 1, further comprising:
    integrating computer-readable program code into a computer system comprising a processor, a computer readable memory in circuit communication with the processor, and a computer-readable storage medium in circuit communication with the processor; and
    wherein the processor executes program code instructions stored on the computer-readable storage medium via the computer readable memory and thereby performs the receiving the composite fingerprint, the authenticating the composite fingerprint and the returning the result of the authentication.

8. The method of claim 7, wherein the computer-readable program code is provided as a service in a cloud environment.

9. A system, comprising:
    a processor;
    a computer readable memory in circuit communication with the processor; and
    a computer readable storage medium in circuit communication with the processor;
    wherein the processor executes program instructions stored on the computer-readable storage medium via the computer readable memory and thereby:

receives a composite fingerprint, wherein the composite fingerprint comprises thermal image data generated from a single thermal scan of a reference finger by a thermal scanner, wherein the composite fingerprint thermal image data comprises a first fingerprint plurality of ridges having a first temperature value and a second fingerprint plurality of ridges having a second temperature value that is different from the first temperature value;

authenticates the composite fingerprint in response to matching the first plurality of ridges to a known fingerprint of the reference finger and to matching the second plurality of ridges to a known fingerprint of an other finger that is different from the reference finger; and returns a result of the authentication.

10. The system of claim 9, wherein the authentication includes pre-processing the composite fingerprint in a process that is selected from the group consisting of:

a noise removal process that is selected from ridge thinning and false minutiae removal;

extracting information from the composite fingerprint selected from minutiae, singular points and directional fields; and converting gray scale values to binary values.

11. The system of claim 10, wherein the processor executes program instructions stored on the computer-readable storage medium via the computer readable memory and thereby:

matches the extracted information from the composite fingerprint with information extracted from the known fingerprint of the reference finger and information extracted from the known fingerprint of the other finger.

12. The system of claim 10, wherein the processor executes program instructions stored on the computer-readable storage medium via the computer readable memory and thereby:

matches the extracted information from the composite fingerprint with information extracted from a combined image of the known fingerprint of the reference finger and the known fingerprint of the other finger.

13. The system of claim 9, wherein the processor executes program instructions stored on the computer-readable storage medium via the computer readable memory and thereby:

in response to a request for authentication, selects the reference finger from a plurality of fingers corresponding to known fingerprints stored in a fingerprint database and the other finger from the plurality of fingers excluding the selected reference finger and corresponding to the known fingerprints stored in the fingerprint database; and sends an indicator of the selected fingers to a local computing device, wherein the selected fingers correspond to the reference finger and the other finger that form the composite fingerprint.

14. The system of claim 9, wherein the processor executes program instructions stored on the computer-readable storage medium via the computer readable memory and thereby:

combines the known fingerprint of the reference finger and the known fingerprint of the other finger into a single combined image; and wherein authentication includes a match the single combined image with the composite fingerprint.

15. A computer program product, comprising:

a computer readable storage medium having computer readable program code embodied therewith, wherein the computer readable storage medium is not a transitory signal per se, the computer readable program code comprising instructions for execution by a processor that cause the processor to:

receive a composite fingerprint, wherein the composite fingerprint comprises thermal image data generated from a single thermal scan of a reference finger by a thermal scanner, wherein the composite fingerprint thermal image data comprises a first fingerprint plurality of ridges having a first temperature value and a second fingerprint plurality of ridges having a second temperature value that is different from the first temperature value;

authenticate the composite fingerprint in response to matching the first plurality of ridges to a known fingerprint of the reference finger and to matching the second plurality of ridges to a known fingerprint of the other finger that is different from the reference finger; and return a result of the authentication.

16. The computer program product of claim 15, wherein the authentication includes a pre-processing the composite fingerprint in a process that is selected from the group consisting of:

a noise removal process that is selected from ridge thinning and false minutiae removal;

extracting information from the composite fingerprint selected from minutiae, singular points and directional fields; and converting gray scale values to binary values.

17. The computer program product of claim 16, wherein the instructions for execution cause the processor to:

match the extracted information from the composite fingerprint with information extracted from the known fingerprint of the reference finger and information extracted from the known fingerprint of the other finger.

18. The computer program product of claim 16, wherein the instructions for execution cause the processor to:

match the extracted information from the composite fingerprint with information extracted from a combined image of the known fingerprint of the reference finger and the known fingerprint of the other finger.

19. The computer program product of claim 18, wherein the instructions for execution cause the processor to:

in response to a request for authentication, select the reference finger from a plurality of fingers corresponding to known fingerprints stored in a fingerprint database and the other finger from the plurality of fingers excluding the selected reference finger and corresponding to the known fingerprints stored in the fingerprint database; and send an indicator of the selected fingers to a local computing device, wherein the selected fingers correspond to the reference finger and the other finger that form the composite fingerprint.

20. The computer program product of claim 15, wherein the instructions for execution cause the processor to:

combine the known fingerprint of the reference finger and the known fingerprint of the other finger into a single combined image; and wherein authentication includes a match the single combined image with the composite fingerprint.

* * * * *